June 19, 1962  D. A. TAYLOR  3,039,817
AIR INTAKE SCOOP FOR VENTILATING SEAT CUSHION
Filed June 1, 1959  2 Sheets-Sheet 1

INVENTOR.
Don A. Taylor,
BY John H. Leonard
His ATTORNEY.

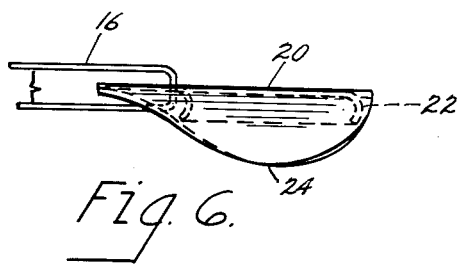
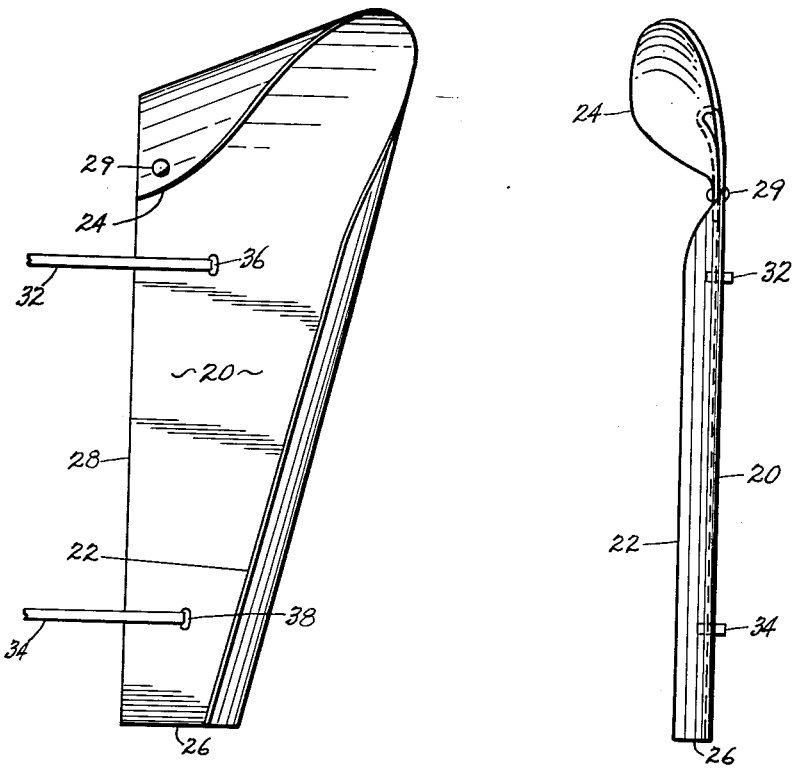
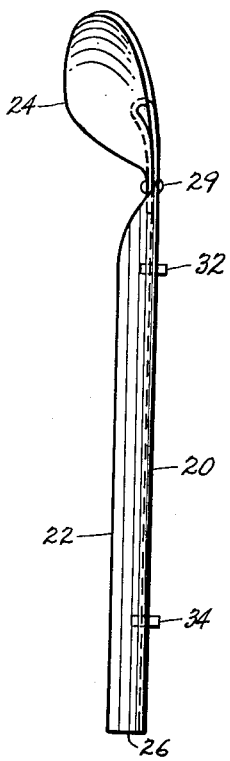

United States Patent Office 3,039,817
Patented June 19, 1962

3,039,817
AIR INTAKE SCOOP FOR VENTILATING
SEAT CUSHION
Don A. Taylor, 216 Mill St., Box 4, Wadsworth, Ohio
Filed June 1, 1959, Ser. No. 817,274
1 Claim. (Cl. 297—180)

This invention relates to an air intake scoop for directing currents of air into the hollowing interior of a vehicle ventilating seat cushion of hollow construction, and to a combination of the scoop with such a cushion.

One form of an automobile ventilating seat cushion currently used includes a seat portion and an attached back receiving portion with each of such portions comprising opposed spaced faces of open weave fabric with a series of coil springs interposed in the space or hollow portion between the faces. This construction provides a seat cushion that functions as a spacer between the seated person and the seat of the vehicle, yet permits air to circulate therebetween and discharge through the fabric, thereby effecting more comfortable driving conditions, particularly in hot weather.

However, the cooling effifficiency of such a cushion is quite low due to the fact that there is no adequate forced circulation of air into and through the hollow portion of the cushion.

An object of the present invention is to provide an air intake scoop for ventilating automobile seat cushions of hollow construction which directs and forces air to circulate through the interior of the cushion and the fabric thereof, thereby substantially increasing the cooling efficiency of the cushion.

A more specific object of the invention is to provide an air intake scoop for vehicle ventilating cushions and which may be secured to the back engaging portion of the cushion and which, when installed for operation, is disposed wholly interiorly of the vehicle.

A further object of the invention is to provide an air intake scoop for vehicle ventilating cushions that is simple in construction, inexpensive to manufacture, easy to install, and dependable and efficient in operation.

Briefly, the foregoing objects are accomplished by the provision of an air intake scoop for vehicle ventilating cushions of the type having seat and back portions, each with opposed spaced faces of open weave fabric with coil springs or other suitable spacing material interposed therebetween. The air intake scoop of the invention is adapted to be detachably secured to the back portion of the cushion or of the vehicle seat at an outer edge thereof and preferably at the outboard edge adjacent the vehicle window and, when so secured, is disposed wholly interiorly of the vehicle.

The air scoop includes a generally elongated baffle plate having certain edges thereof configured to form inturned margins spaced from the forward face of the plate and defining an air intake scoop for receiving and channeling air currents that strike the forward face into a predetermined path to and through the space or hollow between the spaced fabric faces of the cushion. With this construction, an air scoop is provided that substantially increases the cooling ability of the ventilating cushion and does not interfere with the operation of the associated vehicle door or window.

Other objects and advantages of the invention will become apparent from the following description taken in conjunction with the drawings, in which:

FIG. 4 is a front elevational view of the air intake scoop shown in FIG. 1 and showing cushion attaching straps secured thereto;

FIG. 5 is a right side elevational view of the scoop shown in FIG. 5; and

FIG. 6 is a top plan view of the scoop shown in FIG. 4.

Although the invention is shown and described herein with reference to an automobile ventilating seat cushion, it may be used with any type of seat cushion of hollow construction.

Figure 1:
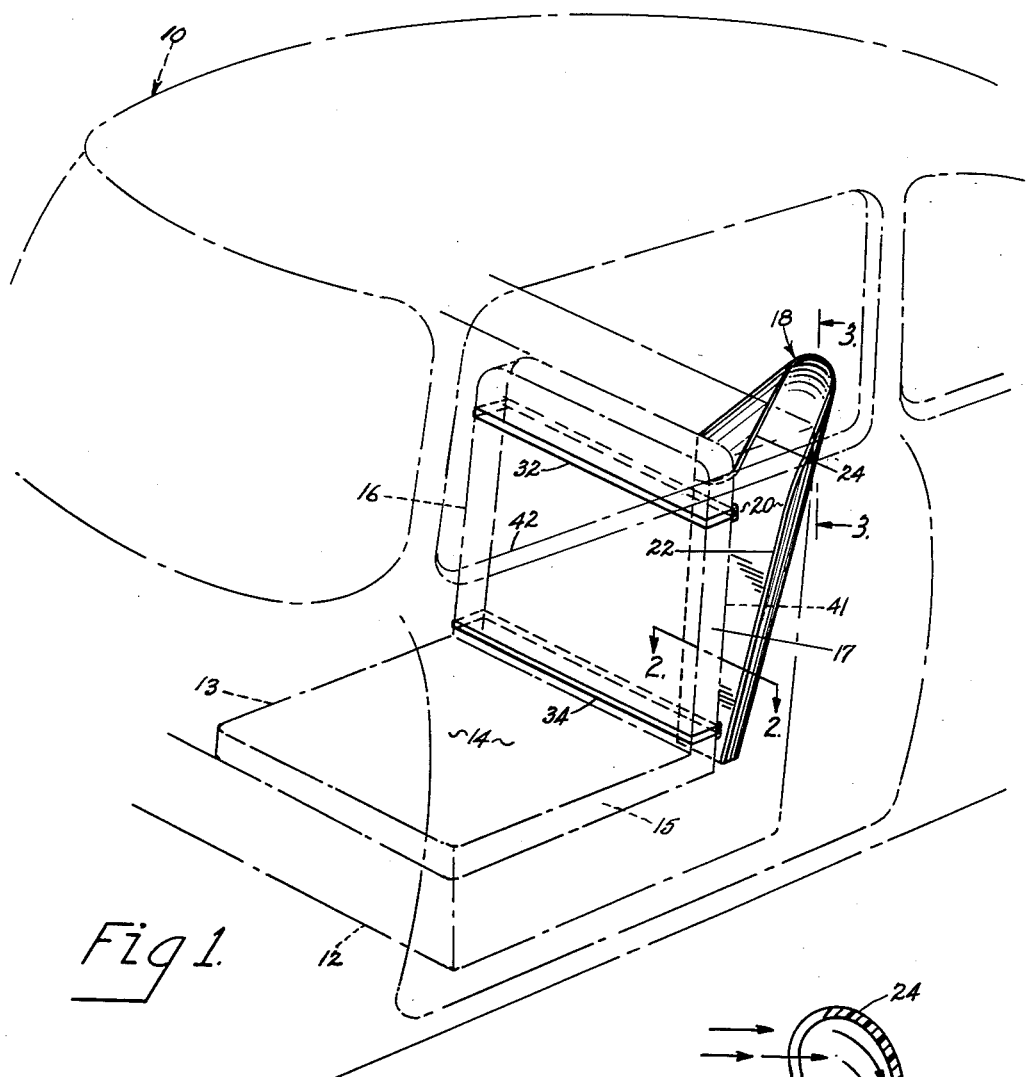
FIG. 1 is a perspective view of an air intake scoop of the invention installed in operating position in a car.

Referring to FIG. 1, there is shown, in dot-dash lines, the central portion of an automobile or vehicle body 10 including the driver's portion of the front seat member 12 therein. Disposed on the seat member 12 is a ventilating cushion or pad member 13 of hollow construction and comprising a seat portion 14 and a seat back portion 16 suitably hinged together. The cushion 13 is of the conventional type wherein each of the portions 14 and 16 thereof includes opposed spaced faces of open weave fabric with a series of coil springs (not shown) interposed in the spaces or hollows 15 and 17 between the fabric layers of the portions 14 and 16, respectively, so as to permit free circulation of air therebetween.

Detachably secured to the back portion of either the vehicle seat back member or the cushion seat back portion in a manner to be hereinafter explained, is one form of an air intake scoop of the invention and generally designated at 18.

The scoop 18 shown for illustration is one for the left hand or driver's seat of a conventional automobile. In the example, it comprises an elongated baffle plate or portion 20 having the lateral margin at the outboard side and the top or end margin bent or curved forwardly and then back into forwardly spaced relation to the plate 20 to form the forwardly extending marginal flanges 22 and 24, respectively, as shown, such that the plate and marginal flanges define the air intake scoop 18 of the invention.

Figure 2:
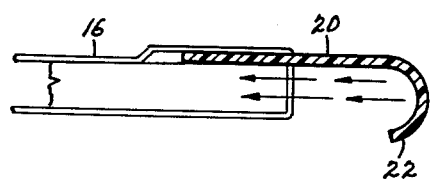
FIG. 2 is an enlarged sectional view taken along the line 2—2 of FIG. 1.

Although the margin 22 is shown as curvilinear in transverse section, as in FIG. 2, and comprises a lateral edge portion of the plate 20 that is curved back upon itself in spaced relation to the plane of the plate, such margin may be planular and bent at a predetermined angle from the plane of the plate 20 to form the side or lateral marginal flange 22 of the scoop 18. The margin 22 is arranged so that, when the scoop is installed, it extends downwardly and inwardly towards the outboard edge of the seat back portion of the cushion, and preferably entirely to the bottom end or edge 26 of the plate 20. Thus the margin 22 is convergent with the opposite or inboard edge 28 of the plate 20.

Figure 3:
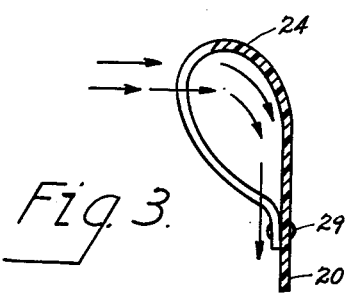
FIG. 3 is an enlarged sectional view taken along the line 3—3 of FIG. 1.

The top or end marginal flange 24 is formed by bending or curving the top margin of the plate 20 forwardly and back upon itself, as shown in FIGS. 3 and 4, and retained in such position by the rivet 29. Although the flange 24 is shown as being curvilinear in transverse section, it may be of any suitable configuration that functions to channel air currents which strike the plate 20 downwardly and inwardly along the plate. Additionally, the flange 24 may be formed to taper downwardly longitudinally, as shown in FIG. 4, so as to converge toward the plate bottom edge 26.

Thus, the plate 20, in coaction with its inturned marginal flanges 22 and 24, defines an air intake scoop adapted to channel and direct air currents striking the plate downwardly and laterally across the plate and through the edges of, and into the hollows 15 and 17 of, the seat cushion portions 14 and 16, respectively, as indicated by the arrows in FIGS. 2 and 3, The air intake scoop 18 may be detachably secured to the seat cushion member 12, or to the seat back portion 16 of the cushion member 13, in operative position, by any suitable attachment means such as cloth bands or elastic tie straps 32 and 34 which pass through the apertures 36 and 38, respectively, in the scoop and tightly encircle the one of the members which is to support the scoop. Accordingly, the scoop 18 of the invention may be quickly and simply attached to any conventional automobile ventilating seat cushion currently in use. In such operative position, the scoop edge 28 is disposed parallel and adjacent to the outboard edge 41 of the cushion back portion 16 and extends, in the preferred form, from the upper to the lower end of the portion 16. A substantial portion of the inboard margin may be accommodated between the cushion portion 16 and the forward face of the vehicle seat back.

Referring to FIG. 1, it will be noted that the air intake scoop 18 is disposed wholly interiorly of the vehicle 10. Thus, the scoop will not interfere with the operation of the vehicle door window or with the operation of the vehicle door.

Additionally, the upper portion of the scoop is disposed above the lower operating level 42 of the vehicle window to receive air currents from the outside of the car when the adjacent door window is open. Likewise, the scoop upper portion may be disposed above the shoulders of the driver of the car. The invention is effective also when the door window is closed, since the scoop 18 will receive air currents circulating within the vehicle.

The invention is effective also in winter as it will receive and direct the vehicle's heated air currents through the cushion in a like manner.

Having thus described my invention, I claim:

An air intake scoop for directing air into a ventilating seat back cushion, said scoop comprising an elongated baffle plate for connection in an operating position, with respect to the cushion, wherein it is generally upright and extends from a location adjacent the top of the cushion downwardly for the major portion of the height of the cushion at the outboard edge of the cushion, said plate having a forward face which, in said position, faces forwardly of the cushion and laterally in the outboard direction from the outboard edge of the cushion, and having a lateral inboard margin which is disposed adjacent the outboard margin of the cushion and rearwardly from the front face of the cushion, and which, lengthwise, extends along the outboard margin of the cushion and having an outboard lateral margin in outwardly spaced relation to said outboard margin of the cushion, a flange at the outboard margin of the plate and extending lengthwise along the major portion of the outboard margin of the plate and convergent relative to said inboard margin in a direction downwardly of the plate, and extending edgewise from said forward face at an angle to said face, said flange defining with said face a scoop for channeling and directing air striking said face generally endwise and laterally of the face toward the inboard margin, an end margin on the upper end of the plate and extending edgewise forwardly from the forward face of the plate at an angle to the forward face, and attachment means on the plate for connecting the plate detachably in said operating position.

References Cited in the file of this patent

UNITED STATES PATENTS

| | | |
|---|---|---|
| 2,594,682 | Ritch | Apr. 29, 1952 |
| 2,610,566 | Schreckengost | Sept. 16, 1952 |
| 2,791,956 | Guest | May 14, 1957 |